United States Patent
Keesee

[15] 3,702,016
[45] Nov. 7, 1972

[54] HANDLE UNIT FOR LAWN MOWER
[72] Inventor: Ernest W. Keesee, 3767 South Court Street, Montgomery, Ala. 36105
[22] Filed: March 24, 1971
[21] Appl. No.: 127,522

[52] U.S. Cl. ..................16/111, 16/112, 280/47.37
[51] Int. Cl. ...........................................A47b 95/02
[58] Field of Search........16/111, 110, 114, 112, 115; 280/47.37

[56] References Cited
UNITED STATES PATENTS
3,423,103  1/1969  Maltarp...................16/111 A
2,478,512  8/1949  Taylor.....................16/111 A Primary Examiner—Bobby R. Gay
Assistant Examiner—Doris L. Troutman
Attorney—Jennings, Carter & Thompson

[57] ABSTRACT

A lower handle member having depending legs pivotally connected to upstanding brackets on mower housing with stop members at opposite sides of legs. Springs urge legs toward brackets and release member moves legs away from brackets permitting angular movement of legs. Upper handle member having depending legs is adjustably connected to legs of lower handle member and retained at selected positions by releasable means.

10 Claims, 3 Drawing Figures

PATENTED NOV 7 1972

3,702,016

INVENTOR.
Ernest W. Keesee
BY Jennings, Carter & Thompson
Attorneys

HANDLE UNIT FOR LAWN MOWER

BACKGROUND OF THE INVENTION

This invention relates to a handle unit for a lawn mower and more particularly to a handle unit which is adapted to move selectively to an operative position rearwardly of the mower to an inoperative position over the mower, with the handle being extendable to vary the effective length thereof.

Heretofore in the art to which my invention relates, the storage and shipment of lawn mowers has been a problem due to the fact that the handle member takes up a lot of space or must be removed from the lawn mower housing. Due to the fact that considerable time and effort is required to remove the handle and then replace the handle when it is desired to use the mower, most handles remain connected to the mower at all times.

BRIEF SUMMARY OF THE INVENTION

In accordance with my present invention, I provide a handle unit having a lower U-shaped handle member which is pivotally connected to the lawn mower housing and releasable means holds the lower handle member selectively in an operative position and an inoperative position relative to the mower housing. Also, an upper handle member is provided with depending legs which are adjustably connected to the legs of the lower handle member whereby the upper handle member is extendable. Releasable latch means retain the handle members at selected positions relative to each other.

A lawn mower handle embodying features of my invention is illustrated in the accompanying drawing, forming a part of this application, in which.

Figure 1:
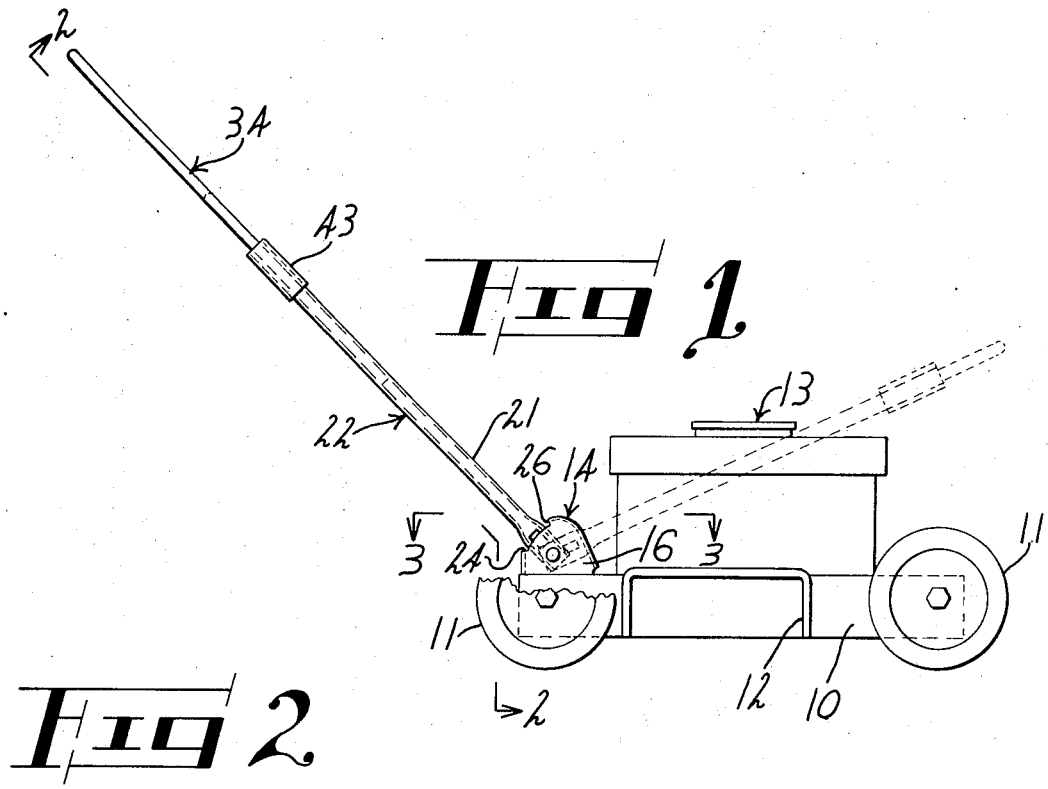
FIG. 1 is a side elevational view showing the handle unit in operative position in solid lines and in the inoperative position in dotted lines.

Referring now to the drawing for a better understanding of my invention, I show a lawn mower housing 10 which is translatably supported by wheels 11. The housing 10 is provided with the usual discharge passageway 12 for grass cuttings. Mounted on top of the housing 10 is a conventional type power unit 13, such as an internal combustion engine.

Figure 3:
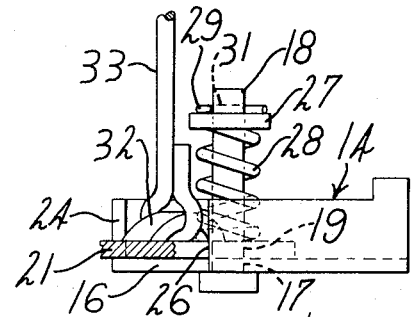
FIG. 3 is an enlarged, sectional view taken generally along the line 3—3 of FIG. 1.

Mounted on the housing 10 adjacent the rear portion thereof are laterally spaced, upstanding brackets 14. As shown in FIG. 3, each upstanding bracket 14 is provided with a vertically extending portion 16 having an opening 17 therethrough for receiving a retainer element 18 which also passes through an opening 19 provided in a depending leg 21 of a lower handle unit indicated generally at 22. The legs 21 are connected to each other by a transverse base member 23 to thus provide a generally U-shaped handle member 22.

Formed integrally with the upper portion of the vertical portion 16 of bracket 14 are inturned flanges or stop members 24 and 26 which are located at opposite sides of the adjacent leg 21 while the leg is adjacent the vertical portion 16, as shown in FIG. 3. Surrounding the elongated retainer element 18 intermediate the inner surface of the leg 21 and a spring abutment 27 is a compression spring 28 which urges the adjacent leg 21 toward the inner surface of the upstanding bracket 14. The spring abutment 27 is held in place by suitable means, such as a cotter key 29 which passes through an opening 31 provided in the retainer element 18.

Figure 2:
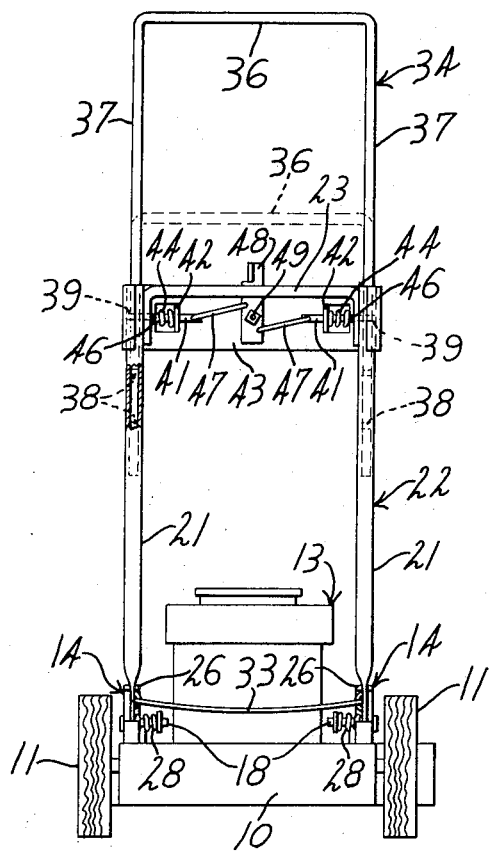
FIG. 2 is a rear elevational view taken generally along the line 2—2 of FIG. 1.

As shown in FIGS. 2 and 3, the lower ends of the legs 21 are relatively flat whereby they extend closely adjacent the vertical portion 16 of the bracket 14 while the upper portions of the leg members 21 are tubular for a purpose to be described hereinafter. As shown in FIG. 3, a portion of the flattened lower end of each leg member 21 is punched inwardly to provide an arcuate member 32 which is spaced from the inner surface of the handle for receiving the adjacent end of an elongated flexible member 33 which extends between the lower ends of the legs 21, as shown in FIG. 2. Upon depressing the flexible member 33, such as by pressing downwardly thereon with the foot of an operator, the lower ends of the legs 21 are moved inwardly away from the vertical portions 16 to a position to clear the stop members 24 and 26 whereby the handle member is then free to move from the operative position shown in solid lines in FIG. 1 to the inoperative position shown in dotted lines. Upon returning the handle member 21 to the solid line position shown in FIG. 1, the legs 21 snap into the recess defined between the stop members 24 and 26 due to the force exerted by the compression spring 28.

A second generally U-shaped handle member 34 having a base portion 36 and depending legs 37 is adjustably connected to the upper portion of the lower handle member 22 whereby the effective length of the overall handle unit may be varied. The upper ends of the tubular members defining the legs 21 are open and receive with a sliding fit the lower ends of the legs 37 of the upper handle member 34 whereby the base member 36 is adapted to move selectively from an extended position shown in solid lines to a contracted position shown in dotted lines in FIG. 2.

Longitudinally spaced openings 38 are provided in the lower portion of the upper handle member 37 which are adapted to move into transverse alignment with openings 39 provided in the upper portion of the legs 21 of the lower handle member 22. Locking pins 41 enter the openings 39 and the aligned opening 38 to thus lock the upper handle member 34 in selected vertical positions relative to the lower handle member 22. Each locking pin 41 extends through a lateral flange 42 carried by a transverse support bracket 43, as shown in FIG. 2. Preferably, the lateral flange 42 is defined by depressing a portion of the metal out of the transverse bracket 43 whereby the flange 42 forms an integral part of the bracket 43. A compression spring 44 surrounds each locking pin 41 between the lateral flange 42 and a spring abutment 46 whereby the locking pins 41 are urged inwardly toward the openings 38.

To move the locking pins 41 at the same time whereby they are extracted from the openings 38, one end of each locking pin 41 is pivotally connected to a link 47 with the other end of the link being pivotally connected to an actuating member 48 which is pivotally connected to the transverse support bracket 43 by a pivot pin 49. As shown in FIG. 2, the ends of the locking pins 41 are pivotally connected to the actuating member 48 at opposite sides of the pivot pin 49 whereby upon pivotal movement of the actuating member, the locking pins 41 are moved together as they move to and from locking engagement with the openings 38 in the legs 37.

From the foregoing description, the operation of my improved handle unit for a lawn mower will be readily understood. While the mower is not in use, the handle is contracted by releasing the locking pins 41 from the openings 38 whereby the base member 36 is adapted to move to the dotted line position shown in FIG. 2 to thus take up a minimum of space. The locking pins 41 thus move into engagement with the uppermost aligned openings 38 to thus retain the upper handle member 34 in the contracted position. The operator then steps on the elongated flexible member 33 whereupon the lower ends of the legs 21 of the lower handle member 22 are moved inwardly of the stop members 24 and 26. The entire handle unit is then pivoted over the lawn mower housing 10, as shown in dotted lines in FIG. 1.

To place the lawn mower back in operation, the operator merely lifts the handle from the dotted line position shown in FIG. 1 whereupon it moves to the solid line position. As the legs 21 reach the recess defined between the stop member 24 and 26, the spring 28 forces the legs 21 outwardly into engagement with the vertical portion 16 of the brackets 14 whereby the handle is locked in a fixed position until the flexible member 33 is depressed whereupon the handle is then free to pivot. With the handle in the operative position, the actuating member 48 is pivoted in a clockwise direction, as viewed in FIG. 2, to thus remove the locking pins 41 from the openings 38, thus permitting the leg members 37 to move relative to the tubular legs 21 of the lower handle member 22. When the handle member 34 is moved to the desired elevation, the actuating member 48 is released whereupon the springs 44 then urge the locking pins 41 into locking engagement with the adjacent, aligned openings 38.

From the foregoing, it will be seen that I have devised an improved handle member for a lawn mower. By providing a handle member which may be moved selectively to an operative position rearwardly of the housing to an inoperative position over the housing, the handle assumes a minimum of space for storage. Also, by providing a second handle member which telescopes into the lower handle member, together with improved means for locking the upper handle member at selected position relative to the lower handle member, the effective length of the handle may be varied with a minimum of effort thus accommodating the handle to the height of the operator. Also, the upper handle member may be moved to the fully contracted position to thus assume a minimum of space while not in use.

While I have shown my invention in but one form, it will be obvious to those skilled in the art that it is not so limited, but is susceptible of various other changes and modifications without departing from the spirit thereof.

What I claim is:

1. In a handle unit for a lawn mower having a translatable housing:
   a. a pair of transversely spaced, upstanding support brackets mounted on said housing,
   b. a generally U-shaped handle member having a base portion with spaced apart depending legs, disposed to extend alongside said upstanding brackets,
   c. there being aligned openings through each said depending leg and the upstanding bracket adjacent thereto,
   d. retainer elements extending through said aligned openings in said legs and said upstanding brackets pivotally connecting said legs to said upstanding brackets,
   e. spring members carried by said retainer elements urging each said leg toward said upstanding bracket adjacent thereto,
   f. stop members carried by each upstanding bracket at opposite sides of the leg adjacent thereto limiting pivotal movement of said leg about said retainer element while said leg is adjacent said upstanding bracket, and
   g. a release member operatively connected to said legs and disposed to move said legs away from the upstanding brackets and out of engagement with said stop members whereby said legs are adapted for pivotal movement relative to said upstanding brackets selectively from an operative position rearwardly of said housing to an inoperative position over said housing.

2. A handle unit for a lawn mower as defined in claim 1 in which said legs extend along the inner sides of said upstanding brackets and said stop members extend inwardly adjacent opposite sides of the leg adjacent thereto.

3. A handle unit for a lawn mower as defined in claim 2 in which said spring member surrounds said retainer element adjacent the inner side of the leg adjacent thereto with a spring abutment carried by said retainer element at the other end of said spring member.

4. A handle unit for a lawn mower as defined in claim 2 in which said stop members are formed integrally with the upstanding brackets.

5. A handle unit for a lawn mower as defined in claim 2 in which said release member is a flexible member which extends between said legs and is connected at opposite ends to said legs.

6. A handle unit for a lawn mower as defined in claim 1 in which a second generally U-shaped handle member having a base portion and depending legs is adjustably connected to the upper portion of the first mentioned U-shaped handle member with the legs of said second handle member being movable to selected positions relative to the legs of said first mentioned handle member.

7. A handle unit for a lawn mower as defined in claim 6 in which the legs of said first mentioned handle member are tubular and receive the lower ends of the legs of said second handle member with a sliding fit, there being longitudinally spaced aligned openings in the legs of said second handle member disposed to move into alignment with openings in said first handle member with locking pins extending through selected aligned openings whereby the effective length of the handle is variable.

8. A handle unit for a lawn mower as defined in claim 7 in which spring members urge said locking pins toward said aligned openings.

9. A handle unit for a lawn mower as defined in claim 7 in which a release member is pivotally mounted on the base portion of said first mentioned handle member and is operatively connected to said locking pins for withdrawing said locking pins from said aligned openings in response to pivotal movement of said release member.

10. A handle unit for a lawn mower as defined in claim 9 in which said release member is connected to said locking pins by link members which are pivotally connected to said release member at opposite side of its pivotal connection to said base portion.

* * * * *